United States Patent
Francois et al.

(10) Patent No.: US 8,793,482 B2
(45) Date of Patent: Jul. 29, 2014

(54) AUTOMATIC CONFIGURATION SAMPLING FOR MANAGING CONFIGURATION PARAMETERS OF A COMPUTER SYSTEM

(71) Applicant: International Business Machines Corporation, Armonk, NY (US)

(72) Inventors: Christopher Francois, Shakopee, MN (US); Mark R. Funk, Mantorville, MN (US); Allan E. Johnson, Mantorville, MN (US); Todd J. Rosedahl, Zumbrota, MN (US); Philip L. Vitale, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/767,022

(22) Filed: Feb. 14, 2013

(65) Prior Publication Data

US 2013/0159693 A1    Jun. 20, 2013

Related U.S. Application Data

(63) Continuation of application No. 12/955,596, filed on Nov. 29, 2010.

(51) Int. Cl.
*G06F 1/26* (2006.01)

(52) U.S. Cl.
USPC ............ 713/100; 713/300; 713/322; 713/324

(58) Field of Classification Search
USPC .................. 713/100, 300, 320, 322, 323, 324
See application file for complete search history.

(56) References Cited

U.S. PATENT DOCUMENTS

| | | | |
|---|---|---|---|
| 7,657,893 B2 | 2/2010 | Armstrong et al. | |
| 8,161,493 B2 | 4/2012 | Floyd et al. | |
| 2002/0138443 A1* | 9/2002 | Schran et al. | 705/64 |
| 2004/0210884 A1* | 10/2004 | Raghavachari et al. | 717/158 |
| 2006/0230187 A1 | 10/2006 | Oz et al. | |
| 2007/0124274 A1 | 5/2007 | Barsness et al. | |
| 2008/0086395 A1 | 4/2008 | Brenner et al. | |
| 2011/0022870 A1 | 1/2011 | McGrane et al. | |
| 2012/0079500 A1 | 3/2012 | Floyd et al. | |

OTHER PUBLICATIONS

H. Y. McCreary et al., "Energy Scale for IBM POWER6 Microprocessor-Based Systems", IBM Journal of Research & Development, vol. 51, No. 6, Nov. 2007, pp. 775-786.

* cited by examiner

*Primary Examiner* — Paul Yanchus, III
(74) *Attorney, Agent, or Firm* — Roy W. Truelson

(57) ABSTRACT

A computer configuration utility automatically alters system configuration parameters to sample multiple different configurations. At least one workrate metric is measured at each sampled configuration. The workrate measurements for the multiple different configurations are compared to determine the effect of different configurations with respect to at least one optimization criterion. System configuration is automatically adjusted to the optimum configuration. Preferably, the workrate metric is (non-idle) instructions executed per unit of time.

16 Claims, 8 Drawing Sheets

AUTOMATIC CONFIGURATION SAMPLING FOR MANAGING CONFIGURATION PARAMETERS OF A COMPUTER SYSTEM

CROSS REFERENCE TO RELATED APPLICATION

This is a continuation application of copending U.S. patent application Ser. No. 12/955,596, filed Nov. 29, 2010, entitled "Automatic Configuration Sampling for Managing Configuration Parameters of a Computer System", which is herein incorporated by reference. This application claims priority under 35 U.S.C. §120 of U.S. patent application Ser. No. 12/955,596, filed Nov. 29, 2010.

FIELD OF THE INVENTION

The present invention relates to digital data processing, and in particular to the managing of configuration parameters of a digital data processing systems for optimum performance.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system is an enormously complex machine, usually having many sub-parts or subsystems. Typically, the system comprises one or more central processing units (CPUs) which form the heart of the system, and which execute instructions contained in computer programs stored in memory. The system further includes data storage devices, such as rotating disk drives, and hardware necessary to communicate with the outside world, such as input/output controllers; I/O devices attached thereto such as keyboards, monitors, printers, and so forth; and external communication devices for communicating with other digital systems.

Computer systems, and particularly large multi-user computer systems, typically have many components which can be configured to operate or interact in a variety of different ways. Various configuration parameters specify modes of operation, resource allocation, operating speeds, limits, and so forth, of these components. These configuration parameters are subject to change, sometimes as a result of automated processes, sometimes through manual intervention by a system administrator, user, or other person.

One example of configuration variability is logical partitioning. Conceptually, logical partitioning means that multiple discrete partitions are established in a single hardware system, and the system resources of certain types are assigned to respective partitions. For example, processor resources of a multi-processor system may be partitioned by assigning different processors to different partitions, by sharing processors among some partitions and not others, by specifying the amount of processing resource measure available to each partition which is sharing a set of processors, and so forth. Memory or other resources may also be partitioned. In general, tasks executing within a logical partition can use only the resources assigned to that partition, and not resources assigned to other partitions.

Nearly any configuration parameter of a computer system may affect how executing tasks perform, and ultimately the efficiency of the system as a whole. These effects may be severe, causing drastic loss of system efficiency and/or unacceptable response time. Different components interact in many complex ways, so that a parameter with respect to one component may affect the performance of many others.

It is extremely difficult to model or predict in advance the effect of configuration changes or the performance of hypothetical configurations. Moreover, the computer system and its environment are very dynamic. Some configuration parameters are subject to frequent change by automated processes. Workload changes, randomly, periodically, and as a result of long-term trends. User expectations change. Managing system configuration parameters for optimum efficiency in a large computer system can therefore be a daunting task.

Conventional methods for managing configuration parameters often involve gathering substantial amounts of performance data over relatively long intervals and analyzing that data to model the system, identify probable sources of system inefficiency, and predict the effect of configuration changes. This analysis is often performed manually by human experts, although there are analytical programs which can be used for this purpose, either alone or in conjunction with human expertise. The use of human experts necessarily means that considerable cost is involved in this process. Moreover, the need to collect a large amount of data and perform complex analysis generally means that the analysis and consequent actions are performed well after the data collection, and can not respond to rapid changes in real time. Finally, modeling of hypothetical configurations is difficult to perform reliably and accurately for all possible permutations of system hardware and software, workload, and configuration parameters.

With increasing complexity of computer systems, there is a need for improved techniques for managing configuration parameters in a computer system.

SUMMARY

A computer system has the capability to automatically alter one or more configuration parameters of the system. The system automatically alters the one or more parameters to sample a plurality of different configurations of the system. For each sampled configuration, at least one workrate metric is measured, the respective workrate measurements for the multiple different configurations being compared to determine the effect of different configurations with respect to at least one optimization criterion. This information is used to automatically adjust the system configuration parameters to an optimum configuration according to the at least one optimization criterion.

In the preferred embodiment, the workrate metric is (non-idle) instructions executed per unit of time. The processor preferably contains a hardware counter and associated logic which can distinguish idle from non-idle instructions and selectively count the latter. In this embodiment, the processor counts all non-idle instructions, instructions being distinguished solely according to instruction code or type. In an alternative embodiment, the processor could take into account the context of execution in determining whether to count an instruction. For example, certain processes, interrupt handlers, or other code segments considered "overhead", such as a low-level operating system process for swapping active threads in a processor, could cause a special register bit to be set so that the instructions executed by the "overhead" process do not increment a count of non-idle instructions executed per unit of time, or cause the count to be incremented differently. Other variations of workrate metric are possible.

A configuration parameter might be used to regulate the amount of resource allocated to some set of processes, or might be used to regulate the workload (e.g. number and/or type of processes) allocated to a set of resources, such as a respective workload assigned to each of multiple logical partitions.

The use of automated configuration sampling in accordance with the preferred embodiment described herein provides effective comparisons of the capacity of multiple system configurations to perform useful work. These comparisons can be made quickly and automatically, enabling optimal system configurations to be determined and configured in something approaching real time.

The details of the present invention, both as to its structure and operation, can best be understood in reference to the accompanying drawings, in which like reference numerals refer to like parts, and in which:

DETAILED DESCRIPTION

Figure 1:
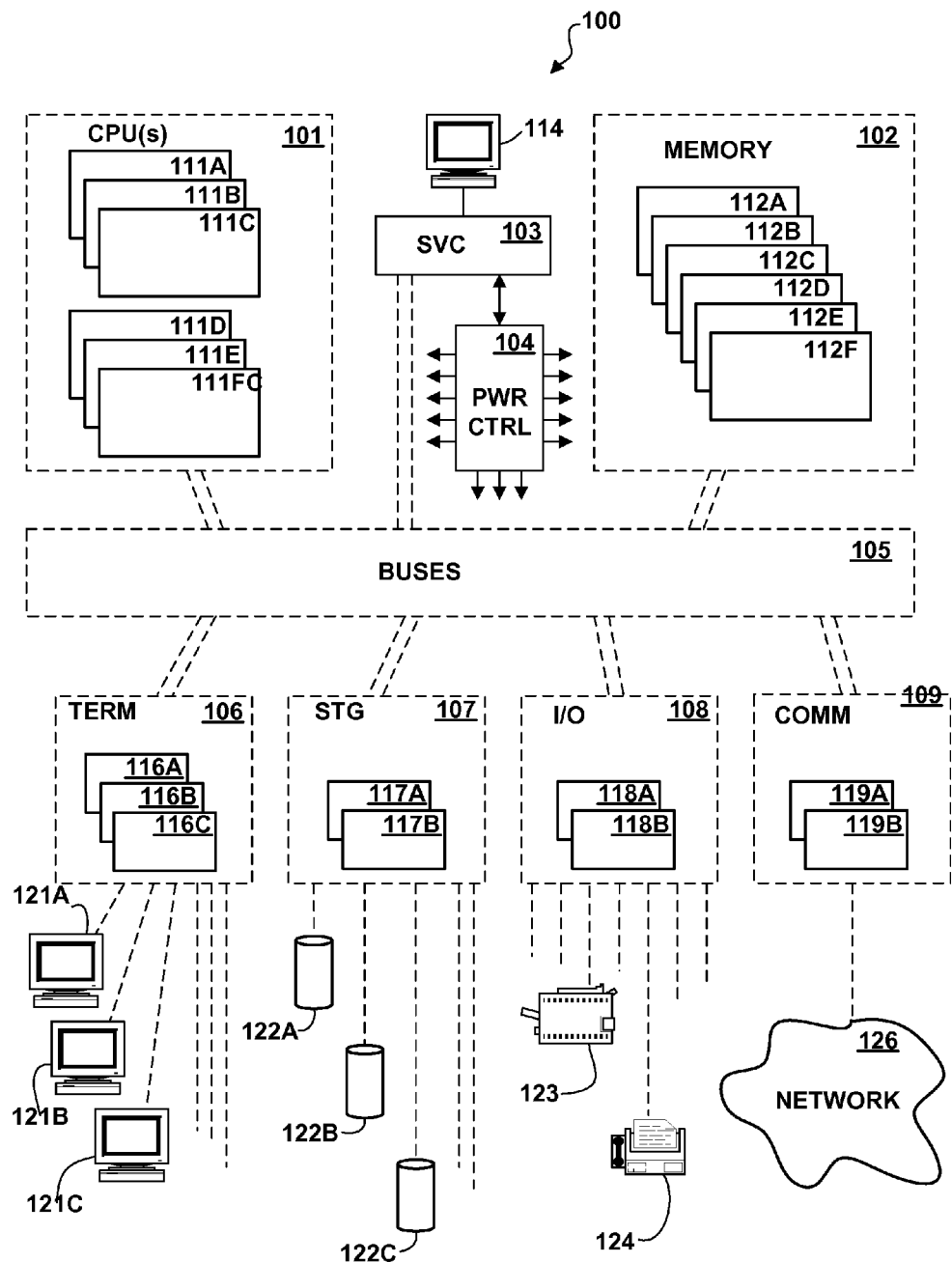
FIG. 1 is a high-level block diagram of the major hardware components of a computer system having multiple configuration parameters, according to the preferred embodiment of the present invention.

Referring to the Drawing, wherein like numbers denote like parts throughout the several views, FIG. 1 is a high-level representation of the major hardware components of a computer system 100 having multiple configuration parameters, according to the preferred embodiment of the present invention. At a functional level, the major components of system 100 are shown in FIG. 1 outlined in dashed lines; these components include one or more central processing units (CPU (s)) 101, main memory 102, terminal interface 106, storage interface 107, other I/O device interface 108, and communications/network interfaces 109, all of which are coupled for inter-component communication via one or more buses 105.

Additionally, a service processor 103 and power control unit 104 preferably provide auxiliary function.

CPU 101 is one or more general-purpose programmable processors, executing instructions stored in memory 102; system 100 may contain either a single CPU or multiple CPUs, either alternative being collectively represented by feature CPU 101 in FIG. 1, and may include one or more levels of on-board cache (not shown). Typically, a large configurable system as described herein will contain multiple CPUs. Memory 102 is a random-access semiconductor memory for storing data and programs. Memory 102 is conceptually a single monolithic entity, it being understood that memory is often arranged in a hierarchy of caches and other memory devices (not shown). Caches may be associated with particular CPU cores or with subsets of CPU cores, as is known in the art.

Service processor 103 is a special-purpose functional unit used for initializing the system, maintenance, and other low-level functions. In general, it does not execute user application programs, as does CPU 101. In the preferred embodiment, among other functions, service processor 103 and attached hardware management console (HMC) 114 provide an interface for a system administrator or similar individual, allowing that person to manage configuration of system 100, including logical partitioning thereof. Service processor 103 also includes functions for managing power control unit(s) 104, which controls the distribution of electrical power to the various system components. Although system 100 of the preferred embodiment contains a dedicated service processor 103 for handling certain configuration and power management functions as described herein, system 100 need not necessarily include a dedicated service processor and hardware management console, and such configuration functions as are available could be performed by other system components, and in particular could be performed by special programs executing on CPU(s) 101.

Terminal interface 106 provides a connection for the attachment of one or more user terminals 121A-C (referred to generally as 121), and may be implemented in a variety of ways. Many large server computer systems (mainframes) support the direct attachment of multiple terminals through terminal interface I/O processors, usually on one or more electronic circuit cards. Alternatively, interface 106 may provide a connection to a local area network to which terminals 121 are attached. Various other alternatives are possible. Data storage interface 107 provides an interface to one or more data storage devices 122A-C, (referred to generally as 122), which are preferably rotating magnetic hard disk drive units, although other types of data storage device could be used. I/O and other device interface 108 provides an interface to any of various other input/output devices or devices of other types. Two such devices, printer 123 and fax machine 124, are shown in the exemplary embodiment of FIG. 1, it being understood that many other such devices may exist, which may be of differing types. Communications interface 109 provides one or more communications paths from system 100 to other digital devices and computer systems; such paths may include, e.g., one or more networks 126 such as the Internet, local area networks, or other networks, or may include remote device communication lines, wireless connections, and so forth.

Buses 105 provide communication paths among the various system components. Although a single conceptual bus entity 105 is represented in FIG. 1, it will be understood that a typical computer system may have multiple buses, often arranged in a complex topology, such as point-to-point links in hierarchical, star or web configurations, multiple hierarchical buses, parallel and redundant paths, etc., and that separate buses may exist for communicating certain information, such as addresses or status information. Typically, buses which communicate data between CPU(s) 101 and memory 102 are separate from those which communicate with the various interfaces 106-109 or service processor 103 and operate at a higher speed, although this is not necessarily the case. It should further be understood that system 100 may be arranged in a nodal or similar architecture as in any of various so-called non-uniform memory access (NUMA) computer system architectures. In such a NUMA system, memory 102 is divided into portions associated with particular CPUs or subsets of CPUs, each node contains internal buses coupling the memory portion with its associated CPU(s), and the system includes node external buses for communicating among the various nodes.

In the preferred embodiment, in addition to various high-speed data buses used for communication of data as part of normal data processing operations, a special service bus connects the various hardware units, allowing the service processor or other low-level processes to perform various functions independently of the high-speed data buses, such as powering on and off, reading hardware unit identifying data, and so forth. However, such a service bus is not necessarily required.

Typically, each of the major functional units described above (except the service processor) may contain multiple independent physical units or components which perform the function. Such a physical unit could, for example, be an electronic circuit card assembly, an integrated circuit chip, a portion of an integrated circuit chip, or some other component. In FIG. 1, CPU 101 is represented as containing six individual physical processor units 111A-F (sometimes referred to as processor cores), it being understood that this number may vary. Each of processor cores 111A-F is typically constructed on a single respective integrated circuit chip, and often multiple cores are constructed on a single integrated circuit chip. Memory 102 is represented as containing six physical units 112A-112F, which are typically card assemblies. Terminal interface 106 is shown as containing three units 116A-116C, storage interface 107 as containing two units 117A-B, I/O and other interface 108 as containing two units 118A-B, and communications interface 109 as containing two units 119A-B, which are typically cards.

It should be understood that FIG. 1 is intended to depict the representative major components of an exemplary system 100 at a high level, that individual components may have greater complexity than represented FIG. 1, and that the number, type and configuration of such functional units and physical units may vary considerably. It will further be understood that not all components shown in FIG. 1 may be present in a particular computer system, and that other components in addition to those shown may be present. Although system 100 is depicted as a multiple user system having multiple terminals, system 100 could alternatively be a single-user system, typically containing only a single user display and keyboard input, or might be a server or similar device which has little or no direct user interface, but receives requests from other computer systems (clients).

Figure 2:
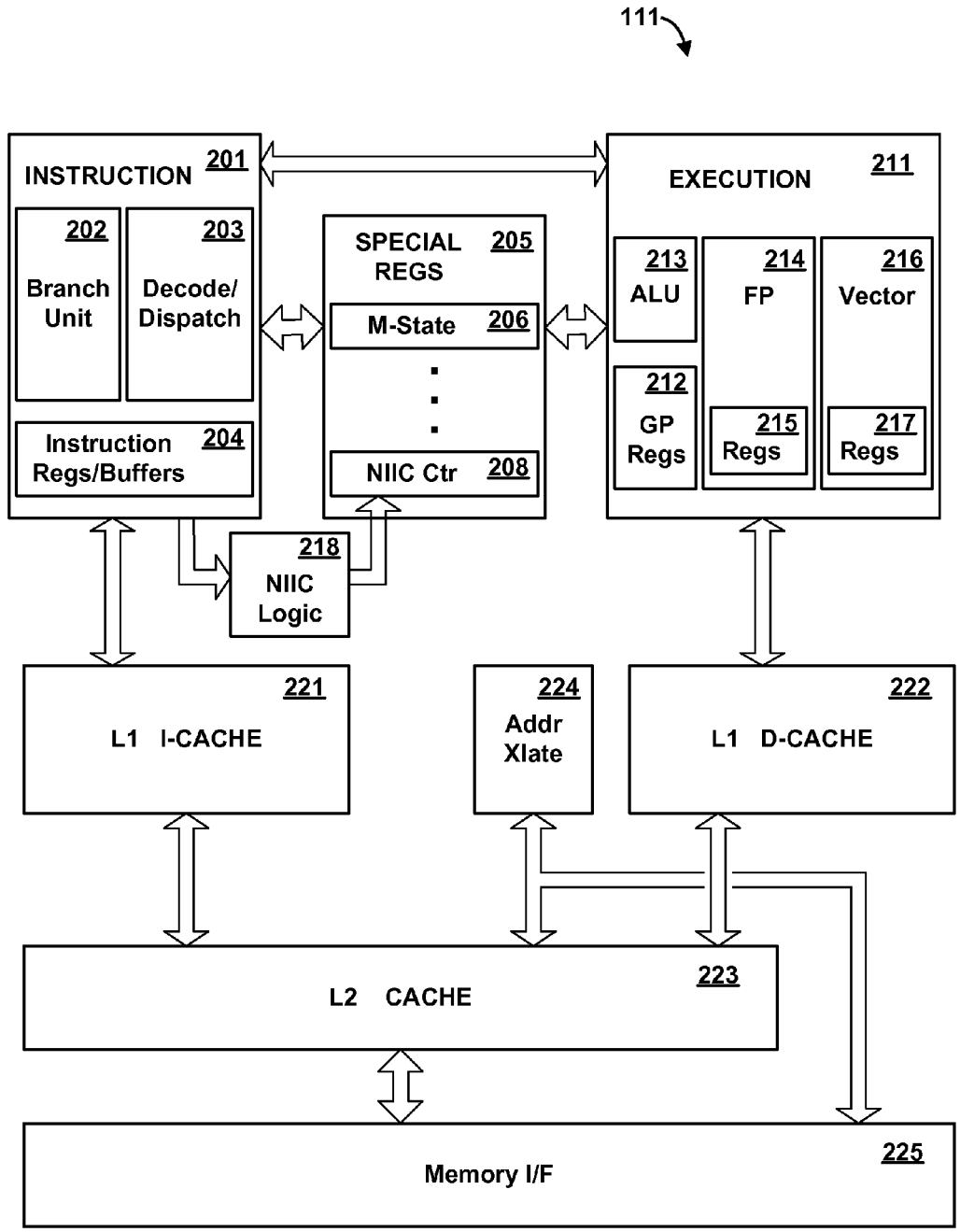
FIG. 2 is a high-level block diagram showing the major hardware components of a processor within the computer system of the preferred embodiment.

FIG. 2 is a high-level diagram of the major components of a processor unit or CPU "core" 111 including certain associated cache structures, according to the preferred embodiment, showing CPU core 111 in greater detail than is depicted in FIG. 1. CPU core 111 includes instruction unit portion 201, special register portion 205, and execution unit portion 211. Also shown in FIG. 2 are Level 1 Instruction Cache (L1 I-Cache) 221, Level 1 Data Cache (L1 D-Cache) 222, Level 2 Cache (L2 Cache) 223, Address Translation unit 224, and Memory Interface 225. In general, instruction unit 201 obtains instructions from L1 I-cache 221, decodes instructions to determine operations to perform, and resolves branch conditions to control program flow. Execution unit 211 performs arithmetic and logical operations on data in registers, and loads or stores data from L1 D-Cache 222. Special registers 205 contain various state data for controlling instruction flow and proper operation of the CPU not included in instruction unit 201 or execution unit 211. L2 Cache 223 is a level 2 cache, generally larger than L1 I-Cache 221 or L1 D-Cache 222, providing data to L1 I-Cache 221 and L1 D-Cache 222. L2 Cache 223 obtains data from a lower level cache (not shown) or from main memory through memory interface 225.

Caches at any level are logically extensions of main memory. In the exemplary embodiment, L1 and L2 caches 221-223 are physically packaged with the CPU core, e.g., are implemented on the same integrated circuit chip as the CPU core. For this reason, these caches are sometimes considered a part of the CPU core. In this embodiment, each CPU core has its own respective L1 and L2 caches, which are not shared with other cores. The representation of FIG. 2 is intended to be typical, and is not intended to limit the present invention to any particular physical or logical cache implementation. It will be recognized that processors and caches could be designed according to different arrangements, and the processor chip or chips may include more caches or fewer caches than represented in FIG. 2, or no caches at all.

Instruction unit 201 comprises branch unit 202, instruction decode/dispatch unit 203, and instruction registers and buffers 204. Instructions from L1 I-cache 221 are loaded into buffers 204 prior to execution. Depending on the CPU design, there may be multiple buffers (e.g., buffers for different threads, or within a thread, one for a sequential series of instructions, and others for branch-to locations), each of which may contain multiple instructions. Decode/dispatch unit 203 selects one or more instructions to be dispatched for execution from one or more of buffers 204 in a current machine cycle, and decodes the instruction(s) to determine the operation(s) to be performed or branch conditions. Branch unit 202 controls the program flow by evaluating branch conditions, and refills buffers 204 from L1 I-cache 221.

Execution unit 211 comprises a set of general purpose registers 212 for storing data and a scalar arithmetic logic unit (ALU) 213 for performing arithmetic and logical operations on data in general purpose (GP) registers 212 responsive to instructions decoded by instruction unit 201. Execution unit further includes floating point operations subunit 214, and a vector execution subunit 216. Floating point subunit 214 is a special floating point hardware pipeline for performing floating point operations using larger operands (e.g. double-precision 64-bit operands). Vector execution subunit 216 performs certain vector operations in parallel, i.e., performs a common operation on multiple operands in parallel. Floating point subunit 214 and vector subunit 216 each includes its own respective set of registers 215, 217. In addition to components shown in FIG. 2, execution unit 211 may include additional logic, counters, control hardware, and so forth. It will be understood that the execution unit 211 represented in FIG. 2 is intended to be representative, and that an execution unit may have additional subunits and components (including additional pipelines and registers) or may have fewer than all of the components shown in FIG. 2.

Special registers 205 contain certain state data other than instructions (contained in instruction registers 204) and general purpose data upon which instructions operate (contained in registers 212, 215, 217). For example, special registers 205 may include condition registers 207 containing operation result flags which are used for determining branch conditions, interrupt vectors, error indications, and so forth. In particular, in accordance with the preferred embodiment, special registers include a machine state register 206 and one or more non-idle instruction (NII) counters 208. Machine state register 206 includes data indicating a privilege level of a currently executing thread; these include a hypervisor level corresponding to a thread having hypervisor privileges, and one or more levels corresponding to threads which do not have hypervisor privileges. If CPU core 201 supports concurrent execution of multiple threads, a separate privilege level may exist for each currently executing thread. NII counter(s) 208 contains a count of non-idle instructions executed by CPU core 111, the use of which is explained in greater detail herein. The core may contain multiple NII counters 208; for example, a separate counter can be used to separately count instructions for each executing thread in a multithreaded processor. In accordance with the preferred embodiment, each CPU core is allocated to one and only one logical partition at any instant in time, although this allocation may change from time to time.

Non-idle instruction (NII) logic 218 is coupled to instruction registers/buffers 204 and NII counter(s) 208 to increment NII counter(s) with each non-idle instruction executed. I.e. NII logic determines whether the instruction is of a type requiring incrementing of the counter, and determines whether the instruction was in fact executed, and increments an appropriate NII counter accordingly. If the CPU core is of a type in which instructions are executed speculatively, only the instructions which are actually executed as part of the program instruction stream are counted, and speculatively executed instructions which are pruned because a pre-requisite condition is not met are not counted. In the preferred embodiment, NII logic counts all executed non-idle instructions, i.e. an instruction other than an idle instruction (typically a null instruction code), and therefore need only recognize the null code. However, NII logic could be more complex, and count an instruction depending on other state values.

L1 I-cache 221 and L1 D-cache 222 are separate instruction and data caches providing data to instruction and execution units. L2 cache 223 is a non-discriminated cache containing both instructions and non-instruction data. Typically, data is taken from or stored to an L1 cache by the instruction or execution unit, and if the data is unavailable in an L1 cache, it is loaded into the L1 cache from L2 cache 223, which in turn obtains it from a lower level cache or main memory through memory interface 225. Depending on the processor design, it may be possible to by-pass a cache at one level and load data from a lower level cache or memory.

Address translation unit 224 translates effective addresses (in some architectures, called "virtual addresses" or some other name) generated by instruction unit 201 or execution unit 211 to corresponding real addresses in memory. As is known in the art, a fundamental difference exists between effective addresses on the one hand, and real addresses on the other. An effective address has no fixed correspondence to a physical memory location; this correspondence changes as new pages are loaded into main memory from storage, as processes change, and so forth. A real address corresponds to a fixed physical memory location, although it does not necessarily translate directly to the location. The processor generates effective addresses (which may be called "virtual" or some other term) in an effective address space corresponding to each respective executing process. In some computer architectures, there are multiple levels of effective or virtual address, which may require further translation. The effective addresses are further translated to "real addresses", corresponding to the actual memory locations at which the data is located by address translation unit 224. It will be understood that various computer architectures employ different addressing constructs, and the present invention is not limited to any particular form of addressing.

L1 I-Cache 221 and L1 D-Cache 222 are preferably addressed using effective addresses, and therefore no address translation is required for accessing the level 1 caches. However, the L2 Cache 223 and all memory below it are addressed using real addresses. Therefore, if it is necessary to access a lower level cache or main memory, an effective address generated by the processor is first translated to a real address.

Address translation unit 224 is represented as a single logical entity, but typically includes multiple tables and logic circuitry, which may be distributed in various chip locations. For example, an address translation mechanism may include a translation look-aside buffer, an effective-to-real address translation table, a segment table, and additional structures. Additionally, separate structures could be used for translation of instructions and for non-instruction data.

CPU core 201 may be a multithreaded processor supporting the concurrent execution of multiple threads and simultaneous dispatching of instructions from different threads in the same machine cycle, or it may be a single threaded processor. Where multi-threading is supported, a separate set of most registers exists for each thread. I.e., a separate set of general purpose registers 212, floating point registers 215, and vector registers 217, exists for each thread. Additionally, certain other state or special purpose registers may be duplicated to support multiple active threads, and in particular separate NII counters 208 may exist. The execution unit pipeline hardware, the instruction unit, and the caches are typically shared by all threads.

While various CPU components have been described and shown at a high level, it should be understood that the CPU of the preferred embodiment contains many other components not shown, which are not essential to an understanding of the present invention. For example, various additional special purpose registers will be required in a typical design. Furthermore, it will be understood that the CPU core of FIG. 2 is simply one example of a CPU architecture, and that many variations could exist in the number, type and arrangement of components within CPU core 111, that components not shown may exist in addition to those depicted, and that not all components depicted might be present in a CPU design. For example, the number and configuration of buffers and caches may vary; the number and function of execution unit pipelines may vary; registers may be configured in different arrays and sets; dedicated floating point hardware may or may not be present; etc. Furthermore, CPU core 111 may utilize a simple or complex instruction set.

In the preferred embodiment, system 100 is logically partitionable into a plurality of logical partitions. Logical partitioning is a technique for dividing a single large computer system into multiple partitions, each of which behaves in some respects as a separate computer system. Computer system resources may be allocated in any of various ways for use by the partitions. A given resource may be allocated for exclusive use by a single particular partition, or may be shared among all partitions (or some subgroup of partitions) on a time interleaved or other basis. Some resources may be allocated to respective particular partitions, while others are shared. Examples of resources which may be partitioned are CPU(s) 101, main memory 102, I/O interfaces 106-109, and I/O devices such as terminals 121 or storage units 122. Each user task executing in a logically partitioned computer system is assigned to one of the logical partitions ("executes in the partition"), meaning that it can use only the system resources or share of resources assigned to that partition, and not resources assigned to other partitions. The allocation of resources to partitions and assignment of tasks to partitions are among the configuration parameters of system 100.

Logical partitioning is indeed logical rather than physical. System 100 preferably has physical data connections such as buses running among different hardware components, allowing them to communicate with one another. These hardware resources may be shared by and/or allocated to different partitions. From a physical configuration standpoint, there is preferably no distinction made with regard to logical partitions. The system's physical devices and subcomponents thereof are preferably physically connected to allow communication without regard to logical partitions, and from this hardware standpoint, there is nothing which prevents a task executing in partition A from writing to memory or an I/O device allocated to partition B.

Generally, logical partitioning is enforced by a partition manager embodied as low-level encoded executable instructions and data, although there may be a certain amount of hardware support for logical partitioning, such as special hardware registers which hold state information. The partition manager (and associated hardware, if any) prevent access to the resources allocated to other partitions. Code enforcement of logical partitioning constraints generally means that it is possible to alter the logical configuration of a logically partitioned computer system, i.e., to change the number of logical partitions or re-assign resources to different partitions, without reconfiguring hardware. Generally, some portion of the logical partition manager comprises a user interface for managing the low-level code function that enforces logical partitioning. This logical partition manager interface is intended for use by a single or a small group of authorized users, who are herein designated the system administrator. In the preferred embodiment described herein, this low-level logical partitioning code is referred to as the "hypervisor", and a partition manager interface is referred to as the "hardware management console".

Logical partitioning of a large computer system has several potential advantages. As noted above, it is flexible in that reconfiguration and re-allocation of resources is easily accomplished without changing hardware. It isolates tasks or groups of tasks, helping to prevent any one task or group of tasks from monopolizing system resources. It facilitates the regulation of resources provided to particular users; this is important where the computer system is owned by a service provider which provides computer service to different users on a fee-per-resource-used basis. It may enable a single computer system to concurrently support multiple operating systems and/or environments, since each logical partition can be executing a different operating system or environment. Finally, isolation of tasks and resources makes it more difficult for a process executing in one partition to access resources in another partition, thus providing greater security and data integrity.

Additional background information regarding logical partitioning can be found in the following commonly owned patents and patent applications, which are herein incorporated by reference: Ser. No. 10/857,744, filed May 28, 2004, entitled System for Correct Distribution of Hypervisor Work; Ser. No. 10/624,808, filed Jul. 22, 2003, entitled Apparatus and Method for Autonomically Suspending and Resuming Logical Partitions when I/O Reconfiguration is Required; U.S. Pat. No. 7,475,218 to Abbey et al., entitled Apparatus and Method for Autonomically Detecting Resources in a Logically Partitioned Computer System; U.S. Pat. No. 7,076,570 to Ahrens et al., entitled Method and Apparatus for Managing Service Indicator Lights in a Logically Partitioned Computer System; U.S. Pat. No. 7,028,157 to Block et al., entitled On-Demand Allocation of Data Structures to Partitions; U.S. Pat. No. 7,139,855 to Armstrong et al., entitled High Performance Synchronization of Resource Allocation in a Logically-Partitioned Computer System; U.S. Pat. No. 7,376,948 to Armstrong et al., entitled Selective Generation of an Asynchronous Notification for a Partition Management Operation in a Logically-Partitioned Computer; U.S. Pat. No. 7,076,634 to Lambeth et al., entitled Address Translation Manager and Method for a Logically Partitioned Computer System; U.S. Pat. No. 7,316,019 to Abbey et al., entitled Grouping Resource Allocation Commands in a Logically-Partitioned System; U.S. Pat. No. 7,133,994 to Abbey, entitled Configuration Size Determination in a Logically Partitioned Environment; U.S. Pat. No. 7,155,629 to Lange-Pearson et al., entitled Virtual Real Time Clock Maintenance in a Logically Partitioned Computer System; U.S. Pat. No. 6,957,435 to Armstrong et al., entitled Method and Apparatus for Allocating Processor Resources in a Logically Partitioned Computer System; U.S. Pat. No. 6,766,398 to Holm et al., entitled A Method for Processing PCI Interrupt Signals in a Logically Partitioned Guest Operating System; U.S. Pat. No. 6,820,164 to Holm et al., entitled A Method for PCI Bus Detection in a Logically Partitioned System; U.S. Pat. No. 6,662,242 to Holm et al., entitled Method for PCI I/O Using PCI Device Memory Mapping in a Logically Partitioned System; U.S. Pat. No. 6,912,493 to Scheel et al., entitled Technique for Configuring Processors in System With Logical Partitions; U.S. Pat. No. 6,438,671 to Doing et al., entitled Generating Partition Corresponding Real Address in Partitioned Mode Supporting System; U.S. Pat. No. 6,467,007 to Armstrong et al., entitled Processor Reset Generated Via Memory Access Interrupt; U.S. Pat. No. 6,681,240 to Armstrong et al, entitled Apparatus and Methodfor Specifying Maximum Interactive Performance in a Logical Partition of a Computer; U.S. Pat. No. 6,959,291 to Armstrong et al, entitled Management of a Concurrent Use License in a Logically Partitioned Computer; U.S. Pat. No. 6,691,146 to Armstrong et al., entitled Logical Partition Manager and Method; U.S. Pat. No. 6,279,046 to Armstrong et al., entitled Event-Driven Communications Interface for a Logically-Partitioned Computer; U.S. Pat. No. 5,659,786 to George et al., entitled System and Method for Dynamically Performing Resource Reconfiguration in a Logically Partitioned Data Processing System; and U.S. Pat. No. 4,843,541 to Bean et al., entitled Logical Resource Partitioning of a Data Processing System. The latter two patents describe implementations using the IBM S/360, S/370, S/390 and related architectures, while the remaining patents and applications describe implementations using the IBM i/Series™, AS/400™, and related architectures or variants thereof, it being understood that other system architectures could be used.

Figure 3:
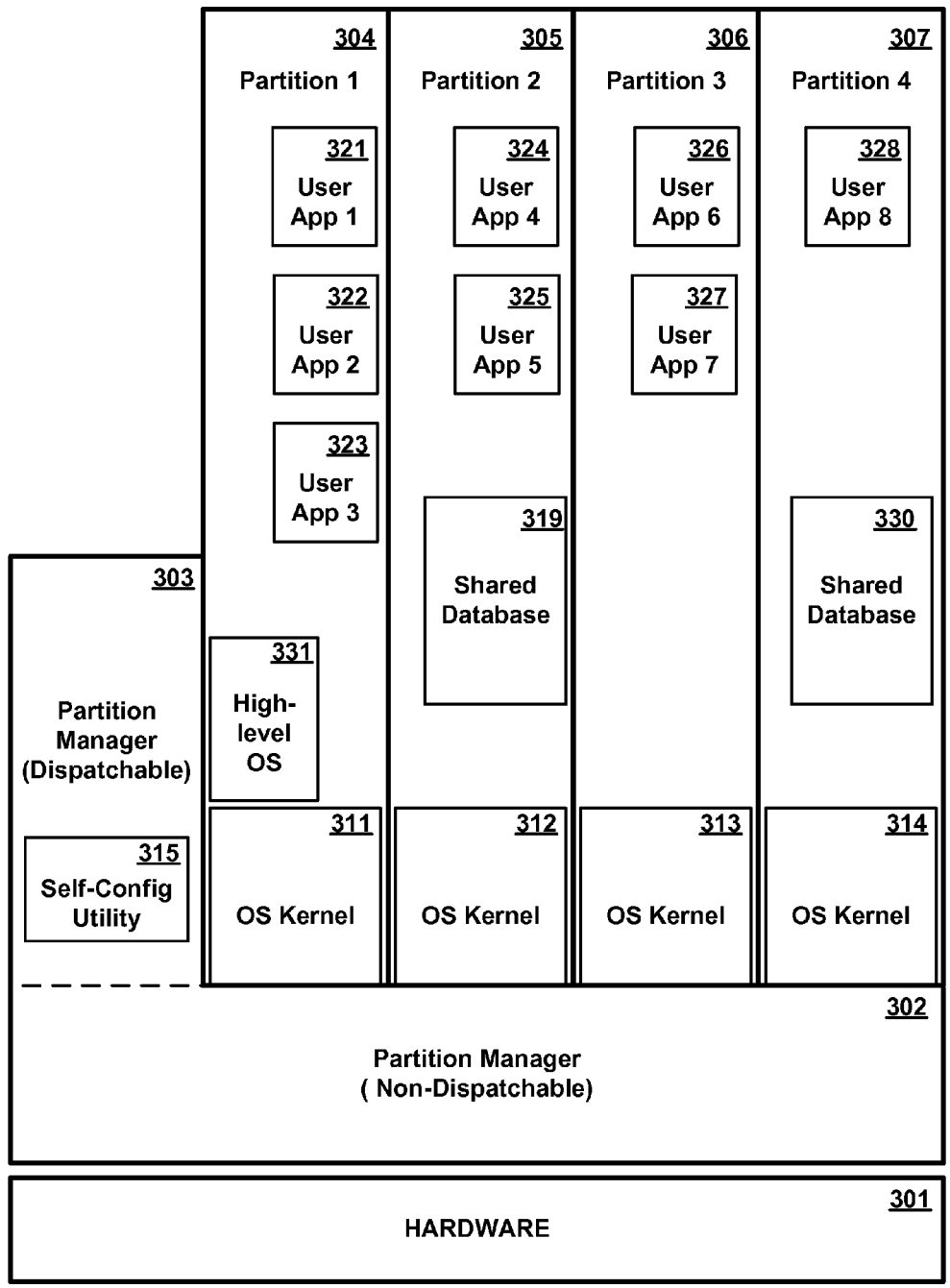
FIG. 3 is a conceptual illustration showing the existence of logical partitions at different hardware and software levels of abstraction in a computer system, according to the preferred embodiment.

FIG. 3 is a conceptual illustration showing the existence of logical partitions at different hardware and software levels of abstraction in computer system 100. FIG. 3 represents a system having four logical partitions 304-307 available for user applications, designated "Partition 1", "Partition 2", etc., it being understood that the number of partitions may vary. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through licensed internal code and ultimately to data bits which get put in machine registers to force certain actions. At a very low level, changing electrical potentials cause various transistors to turn on and off. In FIG. 3, the "higher" levels of abstraction are generally represented toward the top of the figure, while lower levels are represented toward the bottom.

As shown in FIG. 3 and explained earlier, logical partitioning is a code-enforced concept. At the hardware level 301, logical partitioning does not exist. As used herein, hardware level 301 represents the collection of physical devices (as opposed to data stored in devices), such as processors, memory, buses, I/O devices, etc., shown in FIGS. 1 and 2, possibly including other hardware not shown in FIGS. 1 and 2. As far as a processor core 111 is concerned, it is merely executing machine level instructions. In the preferred embodiment, each processor core is identical and more or less interchangeable. While code can direct tasks in certain partitions to execute on certain processors, there is nothing in the processor itself which dictates this assignment, and in fact the assignment can be changed by the code. Therefore the hardware level is represented in FIG. 3 as a single entity 301, which does not itself distinguish among logical partitions.

Partitioning is enforced by a partition manager (also known as a "hypervisor"), consisting of a non-relocatable, non-dispatchable portion 302 (also known as the "non-dispatchable hypervisor" or "partitioning licensed internal code"), and a relocatable, dispatchable portion 303. The hypervisor is super-privileged executable code which is capable of accessing resources, such as processor resources and memory, assigned to any partition. The hypervisor maintains state data in various special purpose hardware registers, and in tables or other structures in general memory, which govern boundaries and behavior of the logical partitions. Among other things, this state data defines the allocation of resources to logical partitions, and the allocation is altered by changing the state data rather than by physical reconfiguration of hardware.

In the preferred embodiment, the non-dispatchable hypervisor 302 comprises non-relocatable instructions which are executed by CPU 101 just as instructions for tasks executing in the partitions. The code is non-relocatable, meaning that the code which constitutes the non-dispatchable hypervisor is at fixed real addresses in memory 102. Non-dispatchable hypervisor 302 has access to the entire real memory address range of system 100, and can manipulate real memory addresses. The dispatchable hypervisor code 303 (as well as all partitions) is contained at addresses which are relative to a logical partitioning assignment, and therefore this code is relocatable. The dispatchable hypervisor behaves in much the same manner as a user partition (and for this reason is sometimes designated "Partition 0"), but it is hidden from the user and not available to execute user applications. In general, non-dispatchable hypervisor 302 handles assignment of tasks to physical processors, memory mapping and partition enforcement, and similar essential partitioning tasks required to execute application code in a partitioned system, while dispatchable hypervisor 303 handles maintenance-oriented tasks, such as creating and altering partition definitions.

As represented in FIG. 3, there is no direct path between higher levels (levels above non-dispatchable hypervisor 302) and hardware level 301. While machine instructions of tasks executing at higher levels can execute directly on a processor core 111, access to hardware resources is controlled by the non-dispatchable hypervisor. Non-dispatchable hypervisor 302 enforces logical partitioning of processor resources. I.e., task dispatchers at a higher level (the respective operating systems) dispatch tasks to virtual processors defined by the logical partitioning parameters, and the hypervisor in turn dispatches virtual processors to physical processors at the hardware level 301 for execution of the underlying task. The hypervisor also enforces partitioning of other resources, such as allocations of memory to partitions, and routing I/O to I/O devices associated with the proper partition.

Dispatchable hypervisor 303 performs many auxiliary system management functions which are not the province of any partition. The dispatchable hypervisor generally manages higher level partition management operations such as creating and deleting partitions, concurrent hardware maintenance, allocating processors, memory and other hardware resources to various partitions, etc. In particular, in the preferred embodiment dispatchable hypervisor 303 includes a dynamic self-configuration utility 315 which dynamically adjusts system configuration parameters by automatically sampling and measuring at least one workrate metric at different configuration parameter values and adjusting the parameters accordingly, as explained in further detail herein.

A special user interactive interface is provided into dispatchable hypervisor 303, for use by a system administrator, service personnel, or similar privileged users. In the preferred embodiment, i.e., where system 100 contains a service processor 103 and attached hardware management console 114, the HMC 114 provides an interface to the dispatchable hypervisor for service and partition management, and will so be assumed in the description herein. Such an interface could be provided by alternative means.

Above non-dispatchable hypervisor 302 are a plurality of logical partitions 304-307. Each logical partition behaves, from the perspective of processes executing within it, as an independent computer system, having its own memory space and other resources. Each logical partition therefore contains a respective operating system kernel herein identified as the "OS kernel" 311-314. At the level of the OS kernel and above, each partition behaves differently, and therefore FIG. 3 represents the OS Kernel as four different entities 311-314 corresponding to the four different partitions. In general, each OS kernel 311-314 performs roughly equivalent functions. However, it is not necessarily true that all OS kernels 311-314 are identical copies of one another, and they could be different versions of architecturally equivalent operating systems, or could even be architecturally different operating system modules. OS kernels 311-314 perform a variety of task management functions, such as task dispatching, paging, enforcing data integrity and security among multiple tasks, and so forth.

Above the OS kernels in each respective partition there may be an optional set of high-level operating system functions 331, as represented in partition 1, shared databases 329, 330, and any of various user applications 321-328. A user may create code above the level of the OS Kernel, which invokes high level operating system functions to access the OS kernel, or may directly access the OS kernel. Although several such entities are depicted in FIG. 3 for illustrative purposes, it will be understood that the number of such entities may vary, and is typically much larger.

While various details regarding a logical partitioning architecture have been described herein as used in the preferred embodiment, it will be understood that many variations in the mechanisms used to enforce and maintain logical partitioning are possible consistent with the present invention, and in particular that administrative mechanisms such as a service partition, service processor, hardware management console, dispatchable hypervisor, and so forth, may vary in their design, or that some systems may employ some or none of these mechanisms, or that alternative mechanisms for supporting and maintaining logical partitioning may be present.

Dynamic Self-Configuration Utility Operation

In operation, self-configuration utility 315 dynamically adjusts one or more configuration parameters to some optimal set of values by iteratively adjusting a parameter, measuring performance according to at least one workrate metric, and comparing the measured workrate with that of one or more other configurations. The utility iteratively continues adjusting the parameter and measuring resultant workrate to achieve some defined optimization condition. The optimization condition is not necessarily a parameter value which produces a maximum workrate, but typically involves a balance of workrate, resource consumption and/or other considerations.

The concept of "workrate" is an important aspect of the embodiments described herein, which should be clearly understood. As used herein, "workrate" is an instantaneous value representing an amount of work per unit of time being processed by the system (or a portion thereof) at a particular point in time. I.e., it is a time derivative of work output. Just as it should be understood what a "workrate" is, it should be understood what it is not. A "workrate" is not a workload, such as an amount of jobs, tasks, threads or other processes active or pending in the system (in processors, queues, etc.) at any instant in time. Nor is it a projection of resources needed to perform one or more tasks, jobs, threads or other processes which may be pending. Nor is a "workrate" a cumulative measure of work produced.

A "workrate metric" is an actual measurement, not necessarily perfect, representing a "workrate", as "workrate" is explained above. A "workrate metric" may represent an aggregate workrate for the entire system, or may be a workrate for some portion of the system, or may be a workrate with respect to a particular subset of jobs, tasks, threads or other processes executing on the system (such as a workrate of all processes executing within a particular logical partition). Although "workrate" conceptually represents an instantaneous value, as a practical matter workrate is generally determined by measuring an amount of work produced over a brief interval of time. This interval should be no longer than needed to produce a meaningful measurement.

In the preferred embodiment, the workrate measurement is a count of non-idle instructions executed in a brief interval. Preferably, this brief interval is one millisecond or less. For many system environments, a meaningful workrate measurement can be obtained in an interval of 100 microseconds or less.

Self-configuration utility 315 determines a workrate by retrieving a respective count of non-idle instructions from each of one or more NIIC Counters 208 at the beginning and end of the measurement interval (or by resetting the NIIC counters to zero at the beginning of the interval and retrieving the counter value at the end of the interval). Since each processor core 111 counts its own non-idle instructions, the self-configuration utility must retrieve counts from each processor in order to determine an aggregate workrate for the system. It can alternatively determine workrates of individual processors or groups of individual processors. Optionally, each processor core 111 could contain a respective set of multiple NIIC Counters 208. For example, each NIIC counter could count instructions for a respective thread of multiple threads simultaneously active in the processor core, or multiple counters could be used for counting different types of instructions. The use of such multiple NIIC counters in each processor would enable self-configuration utility 315 to separately determine a count of non-idle instructions executed for each thread or for other separate determinations.

In the preferred embodiment, NIIC logic 218 causes the NIIC counter(s) to record all instructions which are actually executed except idle instructions. Since an idle instruction can typically be identified by examining only the instruction code, this provides a simple, if somewhat crude, measure of workrate. Alternatively, more sophisticated NIIC logic could be used to filter out certain instructions which may be considered "overhead". For example, a low-level operating system process which swaps active threads in a processor (saves thread state of an executing thread and loads state of a thread waiting on the queue) might be considered "overhead". If a system is thrashing due to extremely constrained memory, the processors can be very busy swapping active threads, yet get very little work done. In such a case, excluding the instructions which involve thread swaps may produce a more useful metric of workrate. Since the instructions involved in such a low-level operating system process are not necessarily unique to that process, filtering out these instructions may require the NIX logic to examine bits in the machine state register 206 or elsewhere to determine the context of execution. A special bit or set of bits could be set aside in machine state register 206 for this purpose.

Although the workrate metric of the preferred embodiment involves a count of selective, particularly non-idle, instructions executed, a workrate metric as used herein is not necessarily limited to a count of selective instructions. For example, with proper hardware support a processor might count a number of integer, floating point and/or vector arithmetic/logic operations performed, and different operations could be weighted differently to produce a composite workrate metric. Other variations of workrate metric may be possible.

Figure 4:
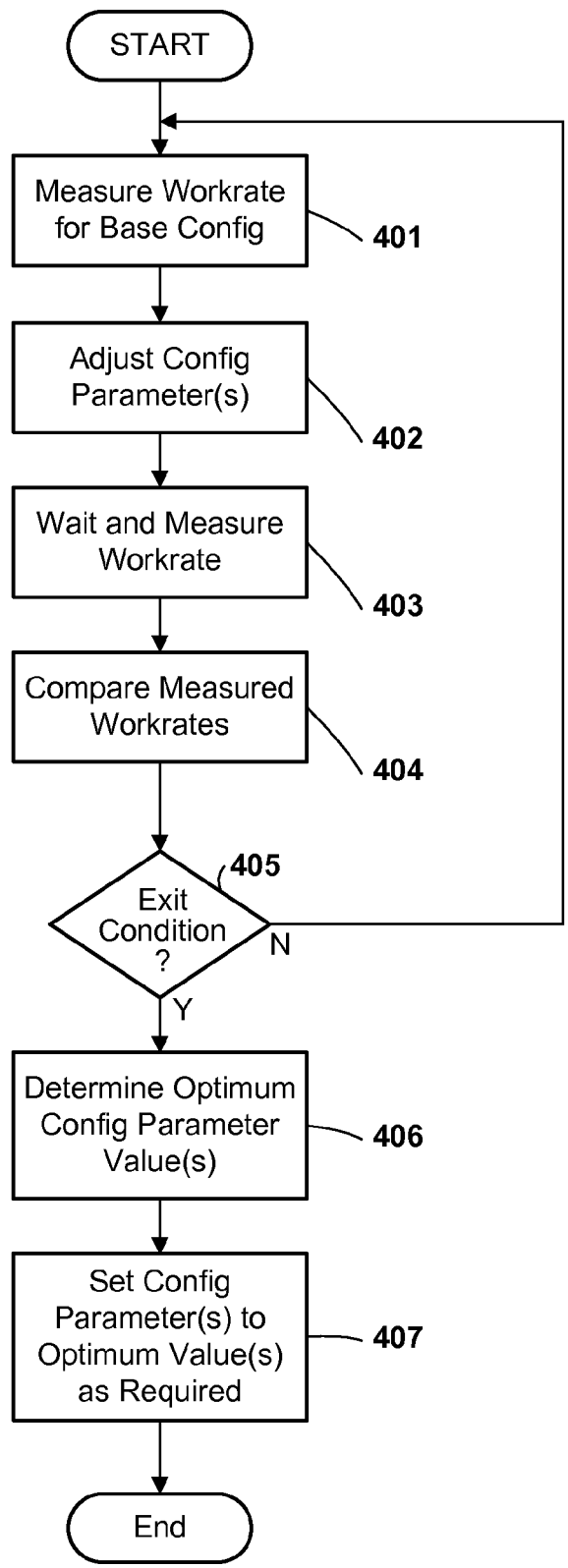
FIG. 4. is a high-level flow diagram showing a generic process of dynamically adjusting configuration parameters performed by a self-configuration utility, in accordance with the preferred embodiment.

FIG. 4. is a high-level flow diagram showing a generic process of dynamically adjusting configuration parameters performed by self-configuration utility 315, in accordance with the preferred embodiment. Self-configuration utility 315 is preferably automatically triggered to begin a self-configuration process, although it could be invoked manually. Any of various automatic triggering conditions could be established. For example, the self-configuration utility could be activated at regular time intervals to adjust configuration parameters. Alternatively, the self-configuration utility could be activated upon detection of any of various conditions indicative of possible performance problems, such as: a number of enqueued tasks exceeding a threshold; an average response time for task completion exceeding a threshold; a number of memory accesses or storage accesses exceeding a threshold, etc. Alternatively, the self configuration utility could be activated upon detection that any of various system parameters has changed significantly from a previously stored value. Triggering might be responsive to a combination of multiple such conditions.

Self-configuration utility 315 initially measures workrate for an existing (base) configuration, i.e. an existing set of values of configuration parameters (step 401). The utility then adjusts the at least one configuration parameter to a trial value or values (step 402). The adjustment can be some arbitrary amount (in the case of a quantitative parameter), or simply an arbitrary different value(s). The configuration utility then waits sufficiently long for the system to reach a steady state operation at the new trial configuration parameter value(s), and measures workrate for the trial configuration (step 403). The measured workrate of the trial configuration is compared with at least one previously measured workrate, either the previously measured workrate of the base configuration, or a previously measured workrate of another trial configuration (step 404).

If an exit condition has not been reached (step 405), the utility loops back to step 402 and adjusts the at least one configuration parameter to a next trial value(s). The self configuration utility has some established order or method for selecting a next trial parameter value or values. For example, the utility might simply try all values or combinations of values of a set of discrete values of value combinations in a pre-determined order, the exit condition being met when all values have been tried. Alternatively, the utility might converge on a quantitative value, increasing or decreasing the value of a parameter depending upon the results of the most recent comparison at step 404, the exit condition being met when little or no further improvement is detected. Other exit conditions or combinations of conditions are possible. When the exit condition is met (the 'Y' branch from step 405), the utility determines an optimum set of configuration parameter values (sep 406). The configuration parameters are then adjusted, as required, to this optimum set of values (step 407).

This optimum set is based on a comparison of the measured workrates and some defined optimization condition. The optimization condition may be inherently determined by the exit condition at step 405, and may be hard-coded into the utility, or may be variable based on a user input. A simple embodiment is to choose the set of parameter values corresponding to the highest workrate. However, for reasons explained below, there are reasons to take other factors into consideration.

A computer system employs multiple resources to perform useful work. Each resource has a respective inherent capacity to perform some function, but that does not necessarily mean that the resource always operates at its inherent capacity. In performing its function, it is limited not only by its own inherent capacity, but by the rate at which it receives necessary data or other required elements externally, i.e., usually from other computer system resources.

Typically, at any instant in time the workrate of a computer system is constrained by a single type of resource. If additional resource of the type which is constraining the system can be made available, the workrate of the system can be increased accordingly. However, if additional resource of a different type is made available, the corresponding increase in workrate is likely to be much less, and there may be no increase at all. This same general principle can be applied to logical partitions of a computer system, or sometimes to other subdivisions.

Figure 5:
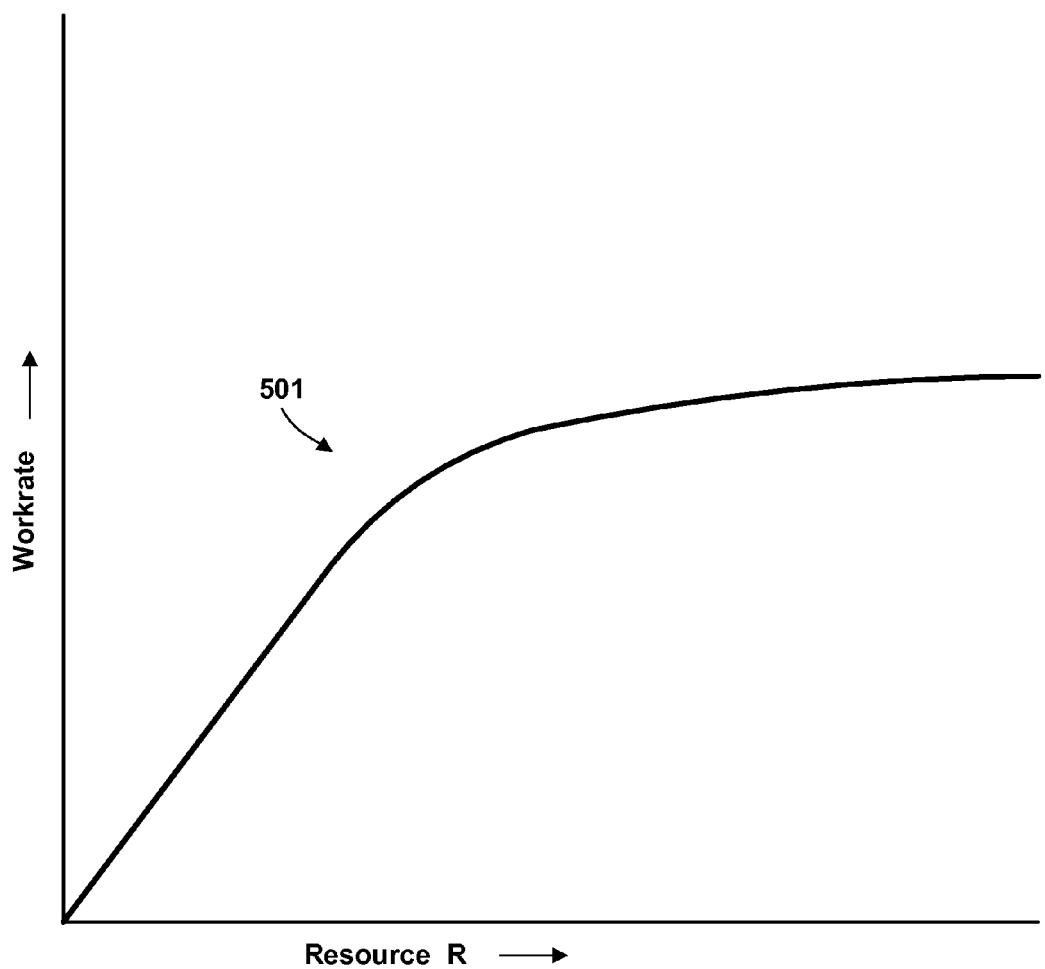
FIG. 5 is a conceptual illustration of a general relationship between an amount of a necessary resource available to perform useful work and resultant workrate.

FIG. 5 is a conceptual illustration of this general relationship between a resource and resultant workrate. Referring to FIG. 5, the x-axis (horizontal) represents an allocation of a hypothetical Resource R, while the y-axis (vertical) represents the resultant workrate of the system (or portion thereof) configured with the corresponding amount of Resource R. If at least some Resource R is necessary to performing the work, then when none of Resource R is allocated or available, no resultant work is performed, as shown. In other words, at zero allocation of Resource R, Resource R is the sole significant constraint on the workrate. As the amount of Resource R allocated increases from zero, there is generally a corresponding increase, more or less proportionate, in the workrate. However, if the available Resource R is further increased, it eventually reaches a point where it is no longer the significant constraining factor on the workrate. I.e., the availability of some other resource(es) will constrain the workrate. This is depicted generally as the "knee" area of the curve 501. Further allocations of Resource R beyond this amount will not produce proportionate increases in workrate, although, depending on the type of resource and the environment, there may still be some increase in the workrate. Generally, the increase in workrate will become less and less for additional increments of Resource R beyond the point at which Resource R is the significant constraint, and may reach a point where there is no further increase at all in the workrate responsive to additional Resource R.

Usually, there is some cost associated with allocation of a resource. This could be a direct cost of paying for a resource (e.g., where computing resources are obtained on a fee for use basis), or could be a cost of unavailability of the resource for other processes, or could even be a cost of electrical power and/or reduction in useful life of the resource from its use. It is undesirable to allocate a resource for use when the resultant increase in workrate will not justify the additional cost of doing so.

Therefore, it would be beneficial to know the profile of the workrate vs. resource curve for significant allocatable resources of a computer system. However, although the general shape might reasonably be assumed to resemble that of FIG. 5, it is extremely difficult to identify the exact profile, and in particular the point at which a resource is no longer the significant constraint on workrate. This profile can vary depending upon a multitude of factors, including the types and volumes of work being performed, availability of other types of resources, priorities assigned to various processes, and so forth. The profile may vary with the time of day, day of week, and in an unpredictable manner throughout the day.

In accordance with an exemplary application, an incremental increase/decrease in workrate responsive to an increase/decrease in a resource is empirically determined by allocating/deallocating, or otherwise providing/removing, the resource, and measuring the resultant workrate. While this does not necessarily determine the entire profile of workrate vs. resource, it can be used to identify a point at which additional resource is not justified, and to adjust a resource allocation accordingly.

In a first exemplary application, a quantitative configuration parameter representing a single resource is adjusted to an appropriate amount by iteratively incrementing/decrementing the parameter value, measuring the resultant workrate, and comparing the workrate delta to some optimization criterion. As one exemplary application, an amount of processor resource is adjusted by the configuration parameter. Processor resource could be adjusted in a variety of ways: a clockrate of a clock signal for one or more processors could be adjusted; one or more processors of a group of processors could be selectively enabled or disabled; or selective timeslices of one or more processors could be selectively enabled or disabled. The quantitative configuration parameter could represent all the processor capability in use in a computer system, or could represent some portion of the processor capability, as for example the processor capability available to a single logical partition of the computer system. Although processor resource is used herein as an exemplary application, it will be understood that a quantitative configuration parameter could be used to control other resources, such as an amount of main memory or cache memory, bus bandwidth, buffer space, and so forth.

Figure 6:
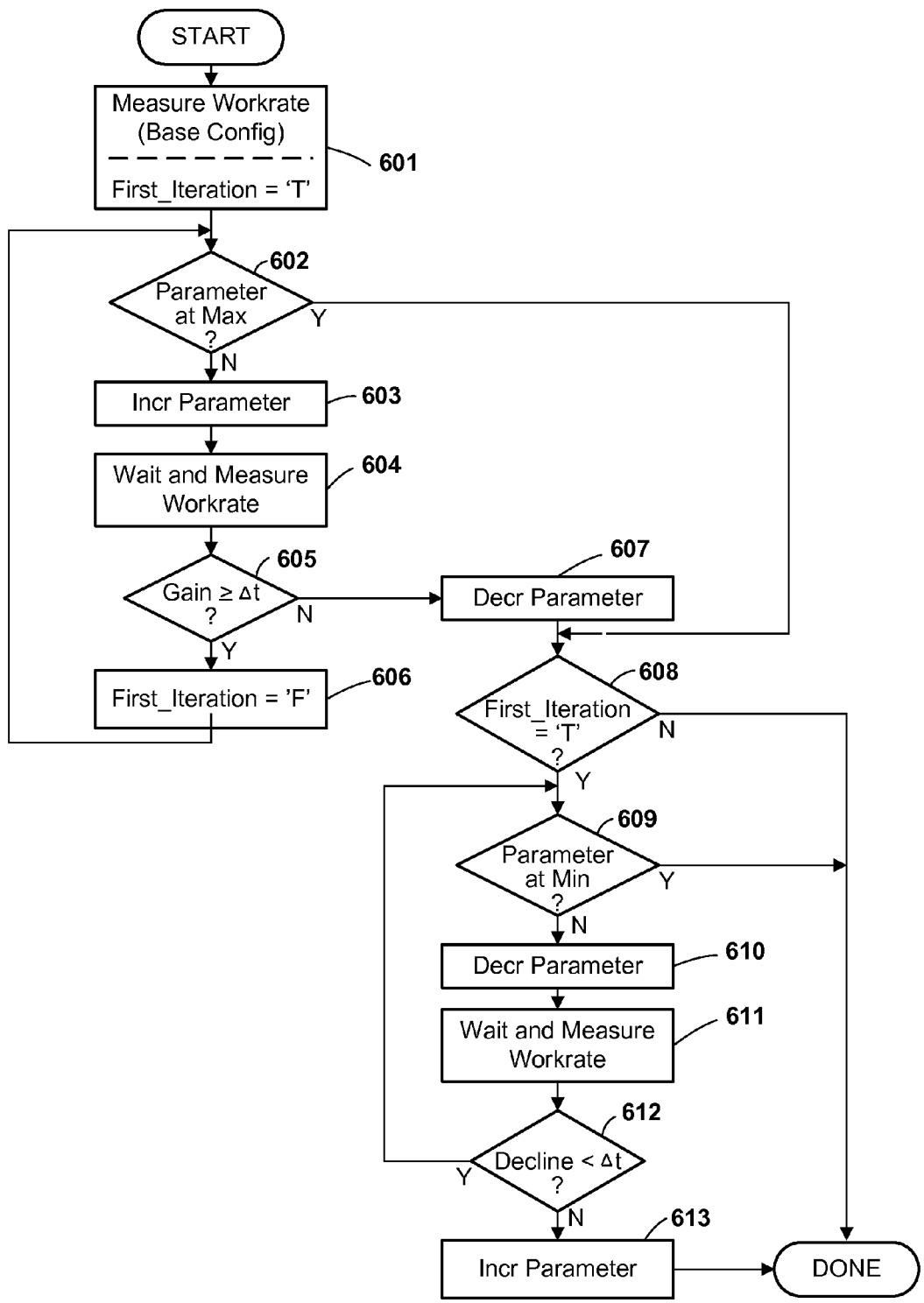
FIG. 6 is a high-level flow diagram showing a process of iteratively adjusting a quantitative configuration parameter to an optimal value, in accordance with a first exemplary application of the preferred embodiment.

FIG. 6 is a high-level flow diagram showing a process of iteratively adjusting a quantitative configuration parameter to an optimal value, in accordance with a first exemplary application of the preferred embodiment. Referring to FIG. 6, the self-configuration utility 315 initially measures workrate for an existing (base) configuration, i.e. an existing value of the quantitative configuration parameter to be adjusted (step 601). A first_iteration flag is set to 'true'.

The utility arbitrarily attempts to adjust the configuration parameter upwards first, e.g., in the case of a processor resource, allocate more processors or increase the clock speed of the processor(s). It first checks whether the configuration parameter is at a maximum value (step 602). A maximum value could be a physical maximum (e.g., a maximum clock speed at which the processor can operate, or an actual number of physical processors present in the system), or could be a previously defined maximum (as a maximum processor capacity allowed to be allocated to a logical partition). If the configuration parameter is not at its maximum value (the 'N' branch from step 602), the configuration parameter is incremented by some pre-defined increment (step 603). The configuration utility then waits sufficiently long for the system to reach a steady state operation at the new configuration parameter value (e.g., using the newly allocated processor resources), and measures the workrate for the configuration parameter value as adjusted (step 604). The workrate measured is the workrate applicable to the resource in question. For example, if the configuration parameter represents system-wide processor resource, then the workrate is the aggregate workrate of all allocated processors; if it represents processor resource of a particular logical partition, then the workrate is the aggregate workrate of all processes in that logical partition.

The self-configuration utility compares the change in workrate (i.e. the difference between the workrate of the current configuration and the workrate of the immediately preceding configuration) with some pre-established $\Delta$ threshold (step 605). The $\Delta$ threshold may be hard-coded or user defined, but it effectively defines an optimization condition for allocation of the corresponding resource. If the difference in workrates equals or exceeds $\Delta$ threshold (the 'Y' branch from step 605), then the first_iteration flag is set to 'F' (step 606), and the utility loops back to step 602. The utility will continue iteratively incrementing the configuration parameters and measuring the resultant workrate until either a maximum value of the configuration parameter is reached (the 'Y' branch from step 602) or the increase in resultant workrate no longer exceeds $\Delta$ threshold (the 'N' branch from step 605).

If the maximum value of the configuration parameter is reached (the 'Y' branch from step 602), there are two possibilities. If the first_iteration flag is 'T' (the 'Y' branch from step 608), then the configuration parameter was already at its maximum value when the adjusting process began. In this case, there is a possibility that the value of the parameter should be reduced (e.g., the amount of processor resource reduced), and self-configuration utility proceeds to step 609 to attempt to reduce the parameter value (reduce the resource allocation). If, however, the first_iteration flag is 'F' (the 'N' branch from step 608), then the self-configuration utility has already adjusted the configuration parameter upwards in an attempt to find an optimum value. In this case, since the parameter is already at its maximum, no further adjustment is possible, and the adjustment process ends, leaving the configuration parameter at its maximum value.

A similar logic is applicable if the resultant workrate increase is less than $\Delta$ threshold. However, in this case, the configuration parameter has already been adjusted one positive increment beyond an optimum value, so the parameter is re-adjusted one increment downward (step 607). If the first_iteration flag is 'T' (the 'Y' branch from step 608), then there was no significant improvement in workrate on the first positive increment of the configuration parameter. In this case, there is a possibility that the value of the parameter can be reduced (e.g. resource reduced) without significant decline in workrate, and self-configuration utility proceeds to step 609 to attempt to reduce the parameter value. If, however, the first_iteration flag is 'F' (the 'N' branch from step 608), then the self-configuration utility has already determined that the configuration parameter should be incremented upwards at least once, and has stopped incrementing because the increment no longer produced a sufficient workrate improvement. In this case, the adjustment process is complete.

If the 'Y' branch is taken from step 608, no upward adjustment of the configuration parameter was possible, and the utility attempts to adjust the configuration parameter downward (reduce resource). It checks whether the configuration parameter is at a minimum value (step 609). As in the case of a maximum, the minimum value could be a physical maximum (e.g., a minimum clock speed available from the hardware or other minimum), or could be a previously defined minimum. If the configuration parameter is not at its minimum value (the 'N' branch from step 609), the configuration parameter is decremented by some pre-defined decrement (step 610). The configuration utility then waits sufficiently long for the system to reach a steady state operation at the new configuration parameter value (e.g., using the reduced amount of processor resources), and measures the workrate for the configuration parameter value as adjusted (step 611).

The self-configuration utility compares the change in workrate (i.e. the difference between the workrate of the current configuration and the workrate of the immediately preceding configuration) with $\Delta$ threshold (step 612). If workrate had declined by less than $\Delta$ threshold (the 'Y' branch from step 612), then the utility loops back to step 609. The utility will continue iteratively decrementing the configuration parameter and measuring the resultant workrate until either the minimum value of the configuration parameter is reached (the 'Y' branch from step 609) or the decrease in resultant workrate equals or exceeds $\Delta$ threshold (the 'N' branch from step 612). If iteration stops because workrate decreased by $\Delta$ threshold or more (the 'N' branch from step 612), then the configuration parameter is incremented by one increment to the previous value (step 613), which is considered the optimum value. The configuration parameter adjustment process then ends.

The exemplary process of FIG. 6 is particularly applicable to a certain class of configuration optimizations in which it is desired to optimize a single quantitative parameter which can be adjusted upwards or downwards. In these situations, the optimum value is generally something above the "knee" of the curve of FIG. 5. For example, for purposes of conserving power, an optimum processor resource allocation may be determined by choosing an appropriate $\Delta$ threshold such that processor use is curtailed whenever the incremental improvement in workrate would not justify the cost of power (and related cost in cooling, shortened component life, etc.) required for the additional processor use.

However, there are other applications in which the amount of a resource available is a significant constraint, and a configuration parameter is used to allocate the scarce resource among multiple competing consumers. For example, processor capacity or memory space might be allocated among multiple logical partitions of a computer system. In these applications, an optimal resource allocation may well lie below the "knee" of the curve of FIG. 5.

Figure 7A:
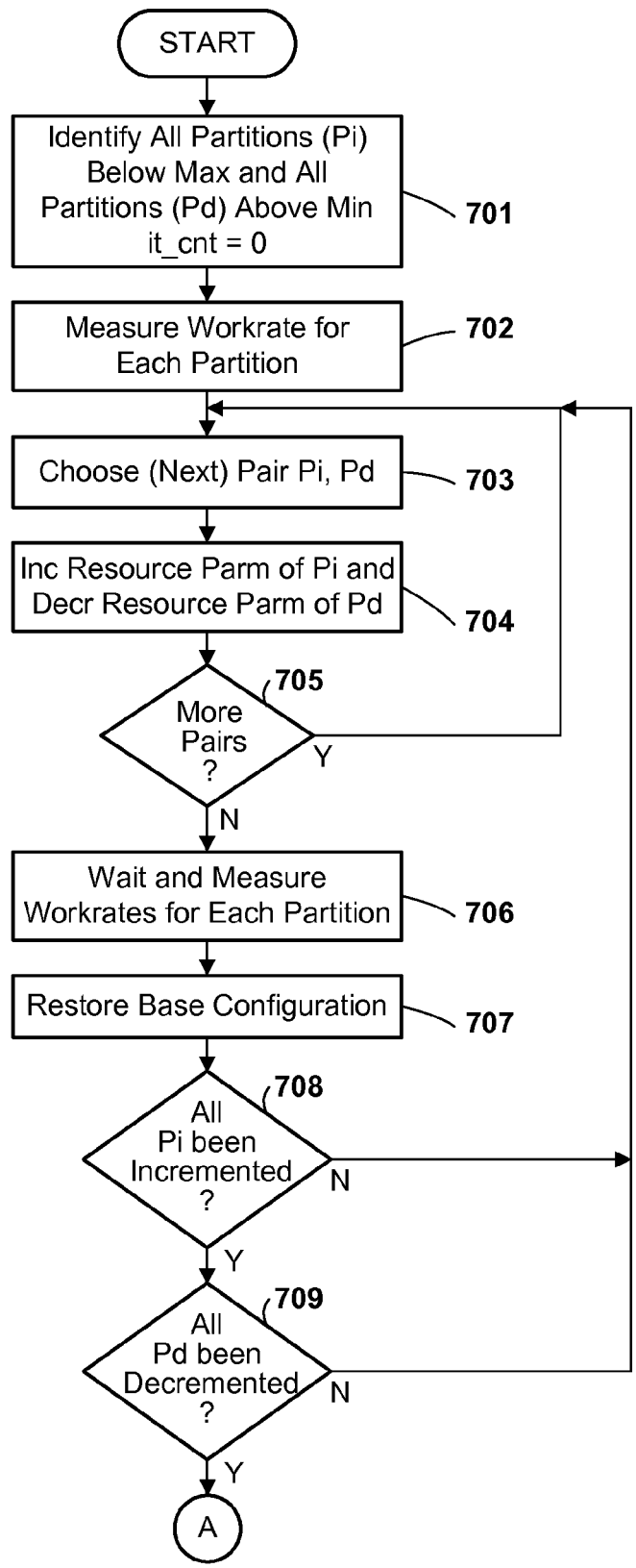
FIGS. 7A and 7B (herein collectively referred to as FIG. 7) are a high-level flow diagram showing a process of iteratively adjusting a quantitative configuration parameter to an optimal set of values, in accordance with a second exemplary application of the preferred embodiment.
Figure 7B:
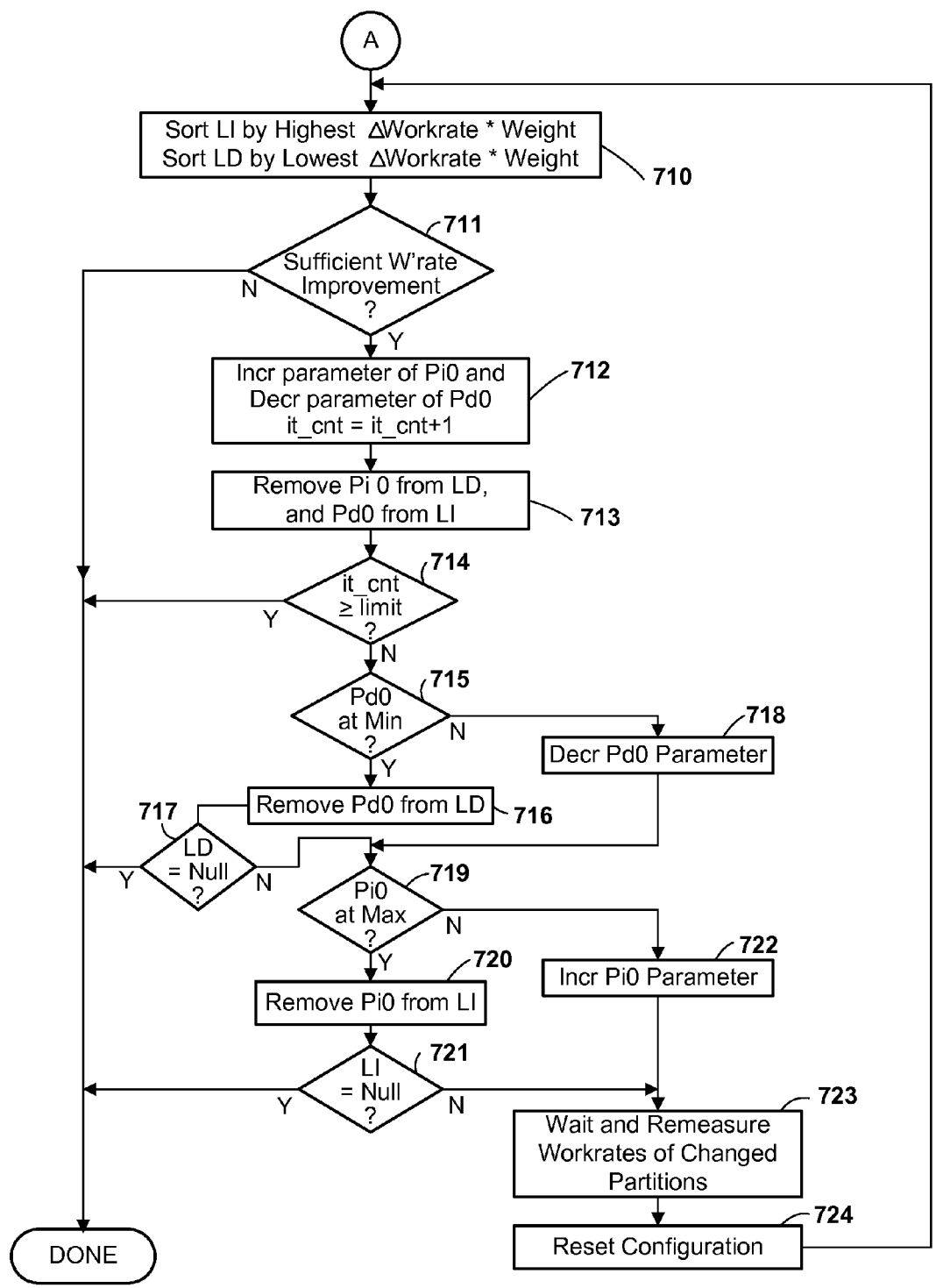

FIGS. 7A and 7B (herein collectively referred to as FIG. 7) are a high-level flow diagram showing a process of iteratively adjusting a quantitative configuration parameter to an optimal set of values, in accordance with a second exemplary application of the preferred embodiment, in which multiple consumers of a typically scarce resource compete for resource allocations. In the exemplary embodiment herein, it will be assumed that the "consumers" to which a scarce resource is allocated are logical partitions of a logically partitioned computer system; the resource could, for example, be memory. It will be understood that other types of resources could be allocated and/or allocations could be among other resource consumers. Referring to FIG. 7, the self-configuration utility initially generates a list (LI) of all partitions (Pi) having a respective configuration parameter value below a respective maximum for the partition, and a separate list (LD) of all partitions (Pd) having a respective configuration parameter value above a respective minimum for the partition (step 701). It is possible, in fact likely, that at least some partitions will be on both lists; it is also possible that some partitions will not be on either list, their respective configuration parameters having been manually set to fixed, unalterable values. An iteration counter (it_cnt) is initialized to 0. For each partition in either list, a respective base workrate is measured (step 702).

The utility then determines an incremental workrate change for each partition in list LI and a decremental workrate change for each partition in list LD. This could be done in various ways, but in an exemplary embodiment, the utility arbitrarily selects a previously unselected partition from list LD and a previously unselected partition from list LI (step 703), and increments the configuration parameter (memory allocation) of the partition Pi from list LI and decrements the configuration parameter (memory allocation) of the partition Pd from list LD (step 704). The utility continues thus pairing partitions from the two lists until no more pairs are possible, at which point the 'N' branch is taken from step 705. The utility then waits for the changes to take effect, and measures the workrates for each of the partitions (step 706). The base configuration is then restored (step 707). If fewer than all partitions Pi in list LI have been measured with incremented resource (the 'N' branch from step 708) or if fewer than all partitions Pd in list LD have been measured with decremented resource (the 'N' branch from step 709), the utility loops back to step 703 and continues to pair partitions. Since the number of items in each list is not necessarily equal, this may require a partition in the shorter list to be chosen more than once. When the workrates of all partitions in both lists have thus been measured, the 'Y' branch is taken from step 709.

The configuration utility then sorts the two lists (step 710). List LI is sorted in descending order of:

($\Delta$workrate)*(weight), where $\Delta$workrate is the workrate measured with the incremented amount of resource (memory) less the workrate measured with the base amount of resource, and weight is a respective weighting factor assigned to the partition. Similarly, list LD is sorted in ascending order of:

($\Delta$workrate)*(weight).

where $\Delta$workrate is the workrate measured with the base amount of resource less the workrate measured with the decremented amount of resource. The use of an (optional) weighting factor allows a system administrator or other user to give greater priority of resource allocation to some partitions; the weighting factor could be the same for all partitions.

The configuration utility then determines whether:

$\Delta$workrate($Pi0$)*weight($Pi0$)>$\Delta$workrate($Pd0$)*weight($Pd0$)+$\epsilon$, where $\Delta$ workrate(Pi0) is the workrate change of the partition at the head of list LI, weight (Pi0) is the weight of the corresponding partition, $\Delta$workrate(Pd0) is the workrate change of the partition at the head of list LD, weight(Pd0) is the corresponding partition's weight, and $\epsilon$ is arbitrary minimum workrate improvement value, intended to prevent undue oscillations in resource allocation (step 711). If not, then insufficient workrate improvement can be made by shifting resource, and the process ends (the 'N' branch from step 711). If, on the other hand, the weighted workrate change (increase) of partition Pi0 exceeds the weighted workrate change of partition Pd0 by more than $\epsilon$, the 'Y' branch is taken from step 711, and the incremental amount of resource (memory) is reassigned from partition Pd0 to partition Pi0, i.e., the applicable configuration parameter of Pi0 is incremented while the corresponding parameter of Pd0 is decremented, to form new base values of these two parameters (step 712). Since the resultant workrate of the partitions has already been measured, it is not necessary to measure a new base workrate for the partitions as re-configured. The iteration counter is incremented, Pi0 is removed from list LD, and Pd0 is removed from list LI step 713).

If the iteration count exceeds a pre-established limit, the 'Y' branch is taken from step 714 and the process ends. The iteration limit is intended to limit the number of configuration change increments at any one time the self-configuration utility is invoked.

If the limit has not been reached (the 'N' branch from step 714, the utility determines whether partition Pd0 has reached the minimum allowable value of its configuration parameter (step 715). If so, partition Pd0 is removed from list LD (step 716), and the utility checks whether list LD is null (step 717). If the list is null, it is no longer possible to shift resource, and the process ends (the 'Y' branch from step 717). If, at step 715, partition Pd0 has not reached its minimum allowable configuration parameter value, the 'N' branch is taken from step 715, and the configuration parameter of Pd0 is further decremented an additional amount (step 718).

The utility determines whether partition Pi0 has reached the maximum allowable value of its configuration parameter (step 719). If so, partition Pi0 is removed from list LI (step 720), and the utility checks whether list LI is null (step 721). If the list is null, it is no longer possible to shift resource, and the process ends (the 'Y' branch from step 721). If, at step 719, partition Pi0 has not reached its maximum allowable configuration parameter value, the 'N' branch is taken from step 719, and the configuration parameter of Pi0 is further incremented an additional amount (step 722). In the event that it was not possible to decrement the configuration parameter of partition Pd0 at step 718, an arbitrary partition from list LD is chosen for decrementing to provide the required incremental resource to partition Pi0.

The utility then waits for the changes to take effect, and measures the workrates of the partitions which have been changed, i.e. Pi0 and/or Pd0 (step 723). The configuration parameters are then reset to the base values (step 724), and the utility loops back to step 710 to re-sort the lists LI and LD.

The self-configuration utility thus continues shifting an incremental amount of resource from one partition to another, until any of the various exit conditions is met, i.e., the incremental improvement in composite workrate (as weighted by any weighting factor) does not exceed $\epsilon$, or the iteration limit is reached, or one of the lists becomes null so that it is no longer possible to shift resources from or to a partition.

Additional Variations

In the exemplary applications above, it has been generally assumed that the configuration parameter(s) govern some amount of resource or resources allocated to a specific set of processes, as the processes executing in a particular logical partition, or even all processes executing on a computer system. However, the configuration parameter(s) might alternatively govern the number and/or type of processes to which a fixed set of resources is allocated. For example, the configuration parameter(s) might govern the number of processes assigned to different logical partitions. In this case, the procedures described above might be used to iteratively migrate processes from a first logical partition to a second logical partition (as in the case of the procedure of FIG. 6) or to iteratively migrate processes from multiple logical partitions to multiple other logical partitions (as in the case of the procedure of FIG. 7).

Although a specific sequence of operations is illustrated in the flow diagrams and described in the accompanying text, it will be appreciated that some operations could be performed in a different order, that some operations need not be performed, and that other operations may be performed instead, consistent with the present invention.

In general, the routines executed to implement the illustrated embodiments of the invention, whether implemented as part of an operating system or a specific application, program, object, module or sequence of instructions, including a module within a special device such as a service processor, are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product embodied in non-transitory computer-readable media, and the invention applies equally regardless of the form of distribution. Examples of non-transitory computer-readable media include, but are not limited to, volatile and non-volatile memory devices, floppy disks, hard-disk drives, CD-ROM's, DVD's, and magnetic tape, it being understood that these examples are not exhaustive. Examples of non-transitory computer-readable media are illustrated in FIG. 1 as system memory 102 and data storage devices 122.

Unless inconsistent with the invention or otherwise qualified herein, computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the non-transitory computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A computer program product for managing configuration parameters of a computer system which executes user tasks on behalf of multiple respective users, comprising:
    a non-transitory computer-readable medium having computer usable program code embodied therewith, the computer usable program code being configured to:
    (a) automatically measure at least one workrate metric to determine a workrate corresponding to an initial configuration of said computer system, said computer system being partitioned into a plurality of logical partitions, each logical partition of said plurality of logical partitions having assigned to it a respective portion of resources of said computer system, each said user task executing in a respective logical partition of said plurality of logical partitions and using only the respective potion of resources of said computer system assigned to the respective logical partition, said workrate being an instantaneous value representing an amount of work per unit of time being processed by at least one logical partition of said computer system at a particular point in time, said workrate metric being an actual measurement representing said workrate;

(b) automatically incrementally alter a value of at least one quantitative configuration parameter of said computer system according to a previously determined increment to generate a modified configuration of said computer system, said at least one quantitative configuration parameter comprising at least one parameter defining at least one of: (a) a respective workload assigned to each of a plurality of said logical partitions, and (b) a respective resource allocated to each of a plurality of said logical partitions;

(c) after a pre-determined measurement interval has elapsed from (b), automatically measure said at least one workrate metric to determine a workrate corresponding to said modified configuration of said computer system;

(d) automatically compare the workrates determined by (a) and (c) to determine an incremental effect of said (b) with respect to at least one optimization criterion;

(e) responsive to (d), automatically determine an increment of said at least one configuration parameter for use in a subsequent iteration; and (f) iteratively repeat said (b) through said (e) using the increment of said at least one configuration parameter determined by said (e).

2. The computer program product of claim 1, wherein said (f) is iteratively repeated until a pre-specified exit condition is met.

3. The computer program product of claim 1, wherein said at least one configuration parameter comprises at least one parameter defining at least one resource allocated to a logical partition of said computer system.

4. The computer program product of claim 1, wherein said at least one configuration parameter comprises at least one parameter defining a respective workload assigned to each of a plurality of logical partitions of said computer system.

5. The computer program product of claim 1, wherein said computer program product receives user input specifying said at least one optimization criterion.

6. The computer program product of claim 1, wherein said at least one workrate metric comprises a measurement of non-idle instructions executed per unit of time.

7. The computer program product of claim 1, wherein said measurement interval is one millisecond or less.

8. The computer program product of claim 1, wherein said computer usable program code automatically measures said at least one workrate metric by identifying executed instructions of at least one type with an instruction identification logic unit within a processor of said computer system and maintaining at least one count of said executed instructions of at least one type with at least one counter register coupled to said instruction identification logic unit.

9. A computer system which executes user tasks on behalf of multiple respective users, comprising:

a memory;

at least one processor, said at least one processor executing instructions storable in said memory;

a partition manager which partitions said computer system into a plurality of logical partitions, each logical partition of said plurality of logical partitions having assigned to it a respective portion of resources of said computer system, each said user task executing in a respective logical partition of said plurality of logical partitions and using only the respective portion of resources of said computer system assigned to the respective logical partition;

a configuration manager capable of automatically altering at least one quantitative configuration parameter of said computer system, said at least one quantitative configuration parameter comprising at least one parameter defining at least one of (a) a respective workload assigned to each of a plurality of said logical partitions, and (b) a respective resource allocated to each of a plurality of said logical partitions, wherein said configuration manager, automatically in each of a plurality of iterations:

(a) incrementally alters said at least one quantitative configuration parameter of said computer system according to an increment determined in a previous iteration of said plurality of iterations to configure said computer system according to a configuration corresponding to a current iteration of said plurality of iterations;

(b) after a pre-determined measurement interval has elapsed from (a), measures at least one workrate metric to determine a workrate corresponding to the configuration corresponding to the current iteration, said workrate being an instantaneous value representing an amount of work per unit of time being processed by at least one logical partition of said computer system at a particular point in time, said workrate metric being an actual measurement representing said workrate;

(c) compares the workrate corresponding to the configuration of said computer system corresponding to the current iteration with a workrate corresponding to a configuration of said computer system corresponding to the previous iteration determined by measuring said at least one workrate metric during the previous iteration, to determine an incremental effect of (a) with respect to at least one optimization criterion;

(d) responsive to (c), determines an increment of said at least one quantitative configuration parameter for use in a subsequent iteration of said plurality of iterations.

10. The computer system of claim 9, wherein said configuration manager repeats said iterations until a pre-specified exit condition is met.

11. The computer system of claim 9, wherein said at least one configuration parameter comprises at least one parameter defining at least one resource allocated to a logical partition of said computer system.

12. The computer system of claim 9, wherein said at least one configuration parameter comprises at least one parameter defining a respective workload assigned to each of a plurality of logical partitions of said computer system.

13. The computer system of claim 9, wherein said configuration manager receives user input specifying said at least one optimization criterion.

14. The computer system of claim 9, wherein said at least one workrate metric comprises a measurement of non-idle instructions executed per unit of time.

15. The computer system of claim 9, wherein said measurement interval is one millisecond or less.

16. The computer system of claim 9, wherein said configuration manager measures said at least one workrate metric by identifying executed instructions of at least one type with an instruction identification logic unit within said at least one processor and maintaining at least one count of said executed instructions of at least one type with at least one counter register coupled to said instruction identification logic unit.

\* \* \* \* \*